United States Patent Office  3,268,530
Patented August 23, 1966

3,268,530
5-ETHYL-5-(6-PURINYL)THIOBARBITURIC ACID
Robert R. Engle and Arthur F. Lewis, Canoga Park, Calif., assignors, by mesne assignments, to Rexall Drug and Chemical Company, Los Angeles, Calif., a corporation of Delaware
No Drawing. Filed Apr. 30, 1964, Ser. No. 364,019
1 Claim. (Cl. 260—252)

This invention relates to a composition of matter classified in the art of chemistry as a substituted barbituric acid derivative.

The invention sought to be patented resides in the concept of a 5-ethyl-5-(6-purinyl)thiobarbituric acid having the formula

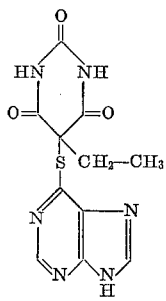

and its hereinafter described equivalents.

The tangible embodiment of this invention possesses the inherent general physical characteristics of being a solid crystalline material. The structure of the compound sought to be patented has been confirmed by ultraviolet spectrophotometric data and by the nature of the starting materials and mode of synthesis.

The tangible embodiment of this invention possesses the inherent applied use characteristics of having significant pharmacological activity as an antipyretic and anticonvulsant agent as determined by recognized and accepted pharmacological test procedures.

The manner and process of making and using the invention will now be generally described so as to enable one skilled in the art of chemistry to make and use the same as follows:

The preparation of the 5-ethyl-5-(6-purinyl)thiobarbituric acid compound sought to be patented is illustrated by the following reaction sequence:

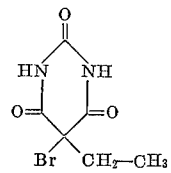
5-ethyl-5-bromobarbituric acid

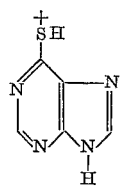
6-mercaptopurine

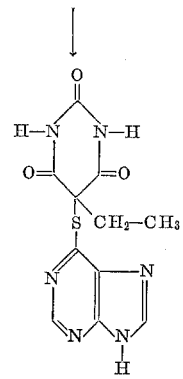
5-ethyl-5-(6-purinyl)thiobarbituric acid

The 5-ethyl-5-bromobarbituric acid and 6-mercaptopurine starting materials are well known compounds in the art of chemistry and are readily prepared by methods described in the chemical literature. 5-ethyl-5-bromobarbituric acid is, for example, conveniently prepared by a method described in J. Chem. Soc. 1931, 1870–1874 while 6-mercaptopurine may be easily prepared by the procedure described in J. Am. Chem. Soc. 74: 411 (1952).

In the reaction sequence depicted above, the starting materials are refluxed for several hours in an anhydrous alcohol solvent such as, absolute ethanol and a mild base such as sodium acetate. The desired product is then recovered by conventional techniques of crystallization. It may be converted, if desired, into its alkaline salts, for example the sodium, potassium and the like salts, which are its full equivalents.

5-ethyl-5-(6-purinyl)thiobarbituric acid and its equivalent salts as described above may be combined with conventional diluents and carriers, to form dosage forms such as tablets, capsules, solutions, suspensions, suppositories and the like.

The best mode contemplated by the inventors for carrying out this invention will now be set forth as follows:

EXAMPLE 5-ethyl-5-(6-purinyl)thiobarbituric acid

A mixture of anhydrous sodium acetate (7.3 g., 0.0890 mole), 5-ethyl-5-bromobarbituric acid (21 g., 0.0893 mole), 6-mercaptopurine (13 g., 0.0765 mole) and absolute ethanol (400 ml.) are refluxed overnight. The solvent is then evaporated under reduced pressure and the residue washed with about 100 ml. of water. The resulting solid is recrystallized three times from water, treated with charcoal, and dried at 100° C. in vacuo to provide a yield of 19.0 g. (81%) of 5-ethyl-5-(6-purinyl) thiobarbituric acid, M.P. 204–207° C.

Analysis.—Calculated for $C_{11}H_{10}N_6O_3S$: C, 43.13%; H, 3.30%; N, 27.44%; S, 10.48%. Found: C, 43.30%; H, 3.00%; N, 27.20%; S, 10.20%.

The subject matter which the applicants regard as their invention is particularly pointed out and distinctly claimed as follows.

We claim:
5-ethyl-5-(6-purinyl)thiobarbituric acid.

No references cited.

HENRY R. JILES, Acting Primary Examiner.
J. W. ADAMS, JR., Assistant Examiner.